United States Patent [19]
Marchal et al.

[11] Patent Number: 5,316,861
[45] Date of Patent: May 31, 1994

[54] PROCESS FOR PRODUCING FLOOR OR WALL COVERINGS AND PRODUCTS OBTAINED

[75] Inventors: Daniel Marchal, Burden, Luxembourg; Dung V. Dao, Aywaille, Belgium

[73] Assignee: Sommer S.A., Luxembourg

[21] Appl. No.: 688,608

[22] PCT Filed: Apr. 12, 1989

[86] PCT No.: PCT/BE89/00050
§ 371 Date: Jun. 6, 1991
§ 102(e) Date: Jun. 6, 1991

[87] PCT Pub. No.: WO90/06233
PCT Pub. Date: Jun. 14, 1990

[30] Foreign Application Priority Data
Dec. 6, 1988 [LU] Luxembourg ............... 87402

[51] Int. Cl.⁵ .......................................... B32B 27/08
[52] U.S. Cl. ............................ 428/516; 428/142; 428/172; 428/195; 428/201; 428/204; 428/203; 428/207; 428/517; 428/519; 428/521; 156/196; 156/243; 156/277

[58] Field of Search ............... 428/156, 172, 195, 201, 428/204, 206, 141, 142, 143, 207, 203, 187, 516, 517, 519, 521, 542.2; 156/196, 209, 182, 157, 240, 242, 243, 277

[56] References Cited

U.S. PATENT DOCUMENTS
4,759,968  7/1988  Janssen .......................... 428/204

FOREIGN PATENT DOCUMENTS
| | | |
|---|---|---|
| 1199050 | 7/1970 | Fed. Rep. of Germany . |
| 2322737 | 9/1975 | France . |
| 0248750 | 9/1987 | France . |
| 1268823 | 3/1972 | Japan . |
| 1334556 | 2/1975 | Japan . |

*Primary Examiner*—Donald J. Loney
*Attorney, Agent, or Firm*—Fishman, Dionne & Cantor

[57] ABSTRACT

The invention relates to a method for fabricating coverings for floors or walls and to such coverings comprising at least an upper sheet (21), a lower sheet (23) charged and made flexible, and a decoration interleaved between said sheets, substantially comprised of a material derived from propylene polymer.

29 Claims, 2 Drawing Sheets

PROCESS FOR PRODUCING FLOOR OR WALL COVERINGS AND PRODUCTS OBTAINED

SUBJECT OF THE INVENTION

The present invention relates to floor and wall coverings exhibiting improved properties, in particular in respect of their behavior in fire and the hazards which they present of releasing toxic fumes on burning, both in an accidental fire and when they are incinerated deliberately.

Its subject is also the process for producing such products.

PROBLEMS ADDRESSED BY THE INVENTION

Floor or wall covering products make extensive use of polymeric compositions derived from vinyl chloride or from nitrogen-containing compounds such as polyurethanes, polyamides and the like.

Accidental combustion of such products during a fire gives rise to extensive releases of gases, especially ones containing chlorine (consisting essentially of HCl). The latter are the primary cause of many deaths during fires or of injuries which are crippling both to the victims and to the emergency services.

Treatment of wastes by deliberate incineration also produces pollution which cannot be overlooked, despite precautions which may be taken, such as preliminary sorting.

The use of filters or of other devices results in any event in a prohibitive increase in the costs of treatment of refuse, without solving all the pollution problems.

Deliberate or accidental burning of refuse dumps gives rise to a release of gaseous toxic agents, which is generally greater than that from a treatment of these same wastes by incineration, because of the uncontrolled nature of the combustion which is, moreover, generally incomplete.

There is therefore an urgent need to have available a method of producing floor and wall covering products which have fewer disadvantages than those in existence.

The environmental impact of wall and floor covering products is described in Patent Application EP-A2-0,274,115. The proposed solution is based on the use of a molten substance comprising inorganic substances, which is homogeneous or deposited on an underlayer of glass fiber nonwoven. After printing, this product may receive a finishing varnish.

The decorative possibilities are obviously necessarily restricted and the physical behavior of the products in particular their strength is not necessarily ensured in all cases.

OBJECTIVES OF THE INVENTION

The present invention is aimed at obtaining a floor or wall covering product of novel type, which is distinguished from the products obtained by processes which are essentially technical in the broad sense, such as woven or tufted carpets or those made of so-called nonwoven materials and which avoids the use of polymers capable of releasing chlorine-containing or nitrogenous compounds.

It is aimed at also bringing about improvements in the properties of the products obtained and in their production conditions.

DESCRIPTION OF THE TECHNIQUE OF THE INVENTION

Until now, the technique of producing floor or wall coverings by a non-textile route has relied broadly on PVC, as a result of the great ease of processing of this product by various techniques, in particular by coating a plastisol onto an underlayer of glass fibres or the like. It should be borne in mind in this respect that users show themselves to be particularly demanding both in respect of the physical use properties of the products (wear resistance and stain resistance) and of the decorative appearance of the product (reproduction of natural or other patterns, gloss, relief or structure, and the like).

The technique employed must therefore also make it possible to obtain the desired decorative effect by printing while ensuring a suitable behavior in use.

It has become apparent that these requirements can be satisfied by a technique comprising the application of at least one upper sheet onto a filled and plasticized lower sheet, a decoration being interposed between the said layers and the whole consisting essentially of a material derived from a propylene polymer.

"Essentially consisting of a material derived from a propylene polymer" is intended to mean a substance in which the quantity of propylene-derived-constituents in the mixture of polymers and/or in the copolymer is greater than 50%.

To obtain the desired optical decorative effects it is advantageous and generally envisaged according to the invention to interleave between the two abovementioned sheets at least one intermediate sheet which is optionally bulk-pigmented and/or optionally provided with a decoration and essentially also derived from a propylene polymer.

The reference to an upper and a lower layer and where appropriate to an intermediate layer refers, of course, to the product as it is envisaged when placed on the floor or on the wall.

According to the invention, the decoration may be obtained according to at least one of the processes chosen from:

mechanical graining and/or embossing;
printing, preferably printing on the inner face of the upper sheet and/or on the inner face of the lower sheet and/or optionally on the intermediate sheet;
the inclusion of solid matter;
the deposition of powders;
at least localized use of foamable substances, colored or otherwise;
and other conventional processes which are known per se in the technique of producing floor or wall coverings.

In general, the invention covers any application of decoration, derived from similar techniques employed for floor and/or wall coverings consisting essentially of PVC.

The lower and upper layers and optionally the intermediate layer(s) are advantageously obtained by calendering or by extrusion. In addition, the application of the upper sheet and optionally of the intermediate sheet is advantageously performed by lining or coextrusion techniques. If, however, the upper layer consisted of a finishing varnish (wear layer) covering, for example, a decoration, this upper layer could be applied by other techniques, especially by coating.

The filling and plasticizing agents added to the starting material to obtain the various layers are, of course, chosen so as not to be per se the cause of major releases of chlorine-containing or nitrogenous gas in the event of combustion.

The use of random propylene copolymers for the various layers is particularly advantageous. These, of course, contain the usual heat and light stabilizer adjuvants and processing agents.

For example, before the calendering it is possible to apply any suitable pattern to the reverse side of the upper layer using conventional printing techniques in use in the technique for producing floor and wall coverings. Photogravure or four-color techniques are very particularly suitable. It is found that such printing does not affect the subsequent lining. The upper sheet is, of course, chosen so as to be at least translucent and preferably transparent so that the decorative pattern can be seen. An upper sheet of the type described, namely one based on propylene polymers and very particularly a random propylene copolymer exhibits an excellent behavior in use. Its wear resistance and its slip properties are satisfactory. The stain resistance characteristics are excellent. The use of compounds which enable these properties to be further optimized obviously forms part of the invention as an optional adjunct.

The polymers used for producing the "upper" layer are not, however, suitable in this form for the so-called "lower" layer because of an unsatisfactory behavior during winding and laying. It has become apparent, according to an important subsidiary characteristic of the invention, that plasticizing adjuvants must be added to the material intended to produce this lower sheet in order to reduce its rigidity.

Copolymers of the EVA, EPDM and EPR type, and also atactic polypropylene may be mentioned by way of illustration of plasticizing adjuvants of concern to the invention. Mixtures of these various compounds with each other can also be suitable.

While an elasticity modulus included in a range from $2 \times 10^{10}$ N/m$^2$ to $2 \times 10^{11}$ N/m$^2$ suitable for the upper sheet, it has become apparent that in the case of the lower sheet this modulus must be reduced to a value in a range of the order of $5 \times 10^7$ N/m$^2$ to $2 \times 10^8$ N/m$^2$.

The said lower sheet also comprises a high proportion of nonpolymeric inert matter, preferably calcium carbonate. This filling greatly contributes to imparting advantageous fire-behavior characteristics to the finished product.

The addition well-known flame-retardant agents, especially of antimony derivatives or other types is, of course, particularly desirable. An appropriate choice and quantity make it possible in particular, to meet the highly demanding standards of fire behavior, not only in the case of the release of toxic products but also in the case of flammability and flame resistance properties.

The combined total of the inert fillers and of the flame-retardant adjuvants, expressed as a weight percentage relative to the total polymeric constituents of the lower layer may be of the order of 50 to 100%.

The above elasticity modulus values relate, of course, to the finished sheet including the filling matter and the flame-retardant matter and optionally other advantageous ingredients.

It is surprising that it should be possible to "fill" in this way a plasticized sheet based on propylene polymers without detriment to its intrinsic properties and without damaging the characteristics of the final calendered product. In fact, the technique combines in one finished product produced by calendering, the properties of a high-grade layer (upper sheet) with those of an underlayer which is sufficiently flexible and inert to permit windability and to reduce the pollution hazards in the event of combustion. Using the technique of the invention it is possible to offer commercially a suitable product which greatly reduces the hazards in the event of combustion.

As shown above, the interposing of a bulk-pigmented intermediate layer between the upper sheet and the lower sheet is particularly advantageous in order to produce a colored background for the decorative pattern printed on the reverse side of the upper sheet, for example.

In principle, the thickness of the upper layer and that of the intermediate layer are markedly smaller than that of the lower layer. These first two layers contribute essentially to the decorative appearance and to the surface wear and stain resistance without affecting the other physical properties, which are generally assumed by the lower layer. The first (upper) layer may, for example, consist of 0.20-mm film, the intermediate layer also of a 0.20-mm film and the lower filled plasticized layer may have a thickness of the order of 1.8 mm for example.

Both the upper layer and the intermediate layer may contain flame-retardant agents, if desired. However, since the flammable polymeric mass (despite the high filler content) consists essentially of the lower layer which is markedly thicker than the superposed layer(s) it is generally sufficient to restrict the presence of the flame-retardant agents to the said lower layer insofar as the latter has been suitably treated.

The product of the invention makes it possible to resort to various traditional complementary techniques, especially for finishing. Thus, the external surface of the upper sheet may be subjected to graining or may be coated with a surface varnish improving the wear or light resistance properties and the like.

The invention will be described in greater detail below with reference to a production plant given by way of illustration.

DESCRIPTION OF THE EMBODIMENTS ACCORDING TO THE INVENTION

Figure 1:
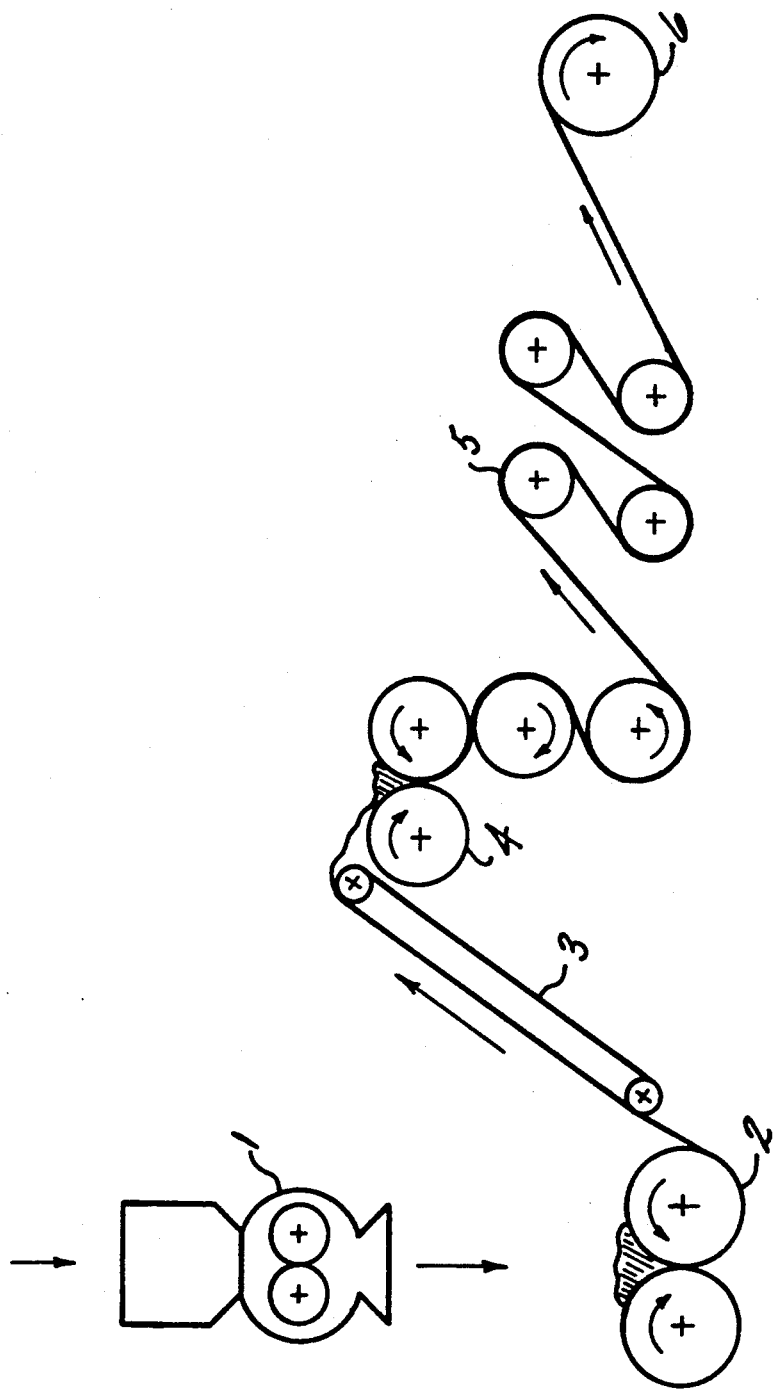
FIG. 1 shows diagrammatically the technique for preliminary production of individual sheets intended to form the product according to the intervention [sic]

The production of individual sheets used in the technique of the invention is shown in FIG. 1.

Figure 2:
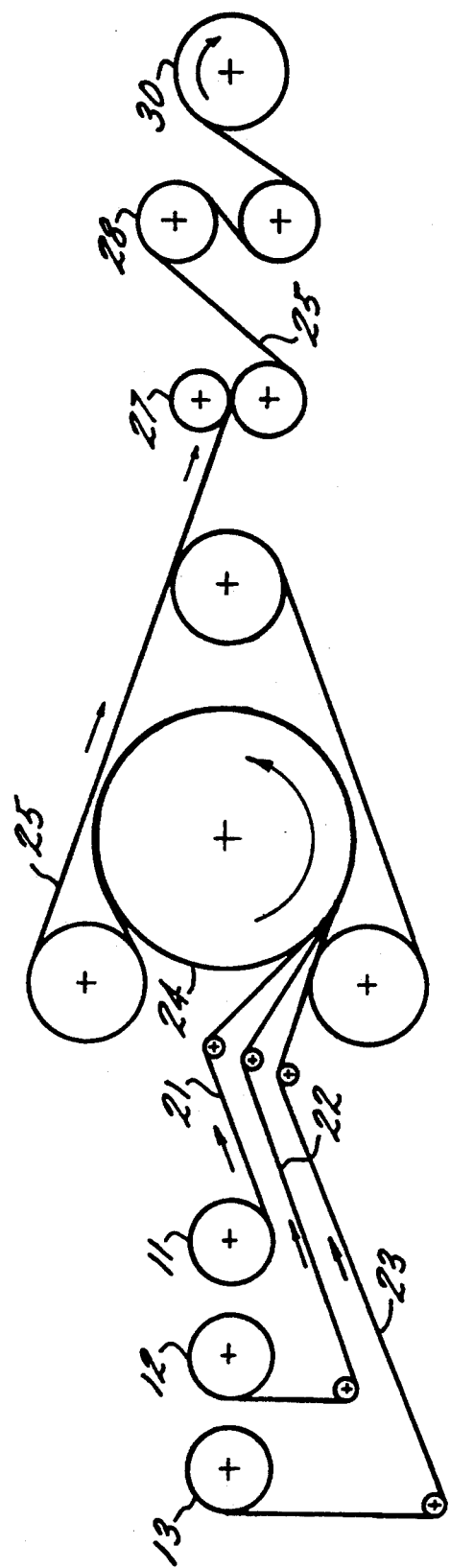
FIG. 2 shows diagrammatically the lining operation applied to individual sheets produced according to FIG. 1.

A plant of the type described in FIG. 1 may be suitable for obtaining three different sheets which are then employed in the plant described in FIG. 2.

An internal mixer 1 of the type of that shown in FIG. 1 may be suitable for producing equally well a transparent film intended for the upper sheet, a pigmented film intended for producing the intermediate sheet or a filled and plasticized film used to obtain the lower sheet.

To produce the transparent film and the intermediate film the work is advantageously carried out in the internal mixer at a temperature of 155° C., whereas a lower temperature of the order to 140° C. is maintained in the case of the filled and plasticized sheet.

The material is then transferred to an external mixer 2 working at 170° C. in the case of the transparent sheet and the intermediate sheet and at approximately 150° C. in the case of the filled and plastified sheet.

A conveyor 3 then carries the material towards a calendering plant 4 which makes it possible to produce a calendered sheet, at a temperature of 190° C. in the case of the transparent sheet and the intermediate sheet, and at a temperature of 180° C. in the case of the plastified filled sheet. Cooling reels 5 are inserted as shown and the material is then wound and stored at 6.

A reel 11 supplies a transparent sheet 21, the reel 12 supplies the intermediate sheet 22 and the reel 13 supplies the filled and plasticized sheet 23, the three sheets being delivered to a combining roll 24 working at a temperature of 160° to 170° C. with a view to producing the calendered product of the invention. On leaving the combining roll, a composite sheet 25 can be led towards a graining unit 27 and the sheet 25 then travels towards cooling rolls 28 to be finally wound onto a reel 30.

EXAMPLE

By way of example, the following compositions may be employed:

| 1. Transparent sheet (upper sheet) | | |
|---|---|---|
| Polypropylene copolymer (Eltex KL 001 P-Solvay) | 100 | |
| Heat stabilizer (Irganox B215 - Ciba Geigy) | 0.2 | |
| Lubricant (Harochem CGN - Harcros) | 0.1 | |
| Light stabilizer (Chimasorb 944 LD-Ciba Geigy) | 0.2 | |
| 2. Intermediate sheet | | |
| Transparent formulation | 100 | |
| Pigment | 4 | |
| 3. Filled and plasticized sheet | A | B |
| Polypropylene copolymer (Eltex KL 001 P-Solvay) | 100 | 100 |
| Heat stabilizer (Irganox B215 - Ciba Geigy) | 0.2 | 0.2 |
| Lubricant (Rhadiastar 1060 - Oleofina) | 0.4 | 0.4 |
| Filler (calcium carbonate) | 1400 | 1500 |
| Flame-retardant agent (aluminum trihydrate) | — | — |
| Ethylene vinyl acetate (Escorene 328 - Exxon) | 200 | 200 |
| Atactic propylene (Stamyroid APP - DSM) | 100 | — |
| EPDM (Dutral 36 FF - Montedison) | — | 200 |

The elasticity moduli of the compositions A and B of the filled plasticized sheet were also measured. The measurements performed with a Metravib viscoanalyzer gave the following results:
A: $2 \times 10^8$ N/m²
B: $5 \times 10^7$ N/m²

A proportion of the fillers ranging up to 50% may be replaced by a flame-retardant agent.

We claim:

1. A covering for a floor or wall consisting essentially of:
   a lower sheet comprising a plasticized polymer, said polymer being derived from propylene monomers, said lower sheet exhibiting a tensile modulus between $5 \times 10^7$ N/M² and $2 \times 10^8$ N/M²;
   a decoration on the lower sheet;
   an upper sheet applied on said lower sheet so that said decoration is interposed between the sheet, said upper sheet comprising a polymer derived from propylene monomer and being translucent or transparent.

2. The covering of claim 1, further comprising:
   one or more intermediate sheets interleaved between the lower sheet and the upper sheet, said intermediate sheets comprising a polymer derived from propylene monomer.

3. The covering of claim 2, wherein at least one of the intermediate sheets is pigmented.

4. The covering of claim 2, wherein at least one of the intermediate sheets are provided with a decoration.

5. The covering of claim 1, wherein the decoration is provided on the lower sheet by a method selected from the group consisting of mechanical graining, mechanical embossing, printing, inclusion of solid matter, deposition of powder, application of a foamable compound and combinations thereof.

6. The covering of claim 1, wherein the sheets comprise a random copolymer wherein greater than 50% of the copolymer is derived from propylene monomer.

7. The covering of claim 1, wherein at least one of the sheets comprises a mixture of polymers wherein greater than 50% of the mixture is derived from propylene monomer.

8. The covering of claim 1, wherein the lower sheet includes a plasticizer selected from the group consisting of an ethylene-vinyl acetate copolymer, an ethylene-propylene-diene copolymer, an ethylene propylene rubber, atactic polypropylene and mixtures thereof.

9. The covering of claim 1, wherein the lower sheet comprises from 50 parts to 100 parts inorganic filler per 100 parts polymer.

10. The floor covering of claim 1, wherein the upper sheet includes an inner surface and an outer surface, said outer surface of the upper sheet being treated.

11. The covering of claim 10, wherein said treated outer surface comprises graining on said outer surface of the upper sheet.

12. The covering of claim 10, wherein said treated outer surface comprises a layer of varnish applied to at least a localized area of the outer surface of the upper sheet.

13. A process for making a floor or wall covering, consisting essentially of:
   providing a lower sheet with a decoration, said lower sheet comprising a plasticized polymer, said polymer being derived from propylene monomer, said polymer having a filler material dispersed therein, and said lower sheet exhibiting a tensile modulous between $5 \times 10^7$ N/M² and $2 \times 10^8$ N/M²;
   bonding an upper sheet on said lower sheet so that the decoration is interposed therebetween, said upper sheet comprising a polymer derived from propylene monomer and said upper sheet being translucent or transparent wherein said bonded upper and lower sheets define a floor or wall covering.

14. The process of claim 13, further comprising interleaving an intermediate sheet between the upper and lower sheets, said intermediate sheet comprising a polymer derived from propylene monomer.

15. The process of claim 14, wherein the intermediate sheet is pigmented.

16. The process of claim 14, wherein the intermediate sheet is provided with a decoration.

17. The process of claim 16, wherein the decoration is provided on the lower sheet by a method selected from the group consisting of mechanically embossing, mechanically engraining, printing, inclusion of solid matter, deposition of powder, application of a foamable compound and a combination thereof.

18. The process of claim 17, wherein the upper sheet has an inner face and an outer face and the printing is applied to the inner face.

19. The process of claim 17, wherein the lower sheet has an inner face and an outer face and the printing is applied to the inner face.

20. The process of claim 13, wherein the upper sheet and the lower sheets are made by calendering or by extruding.

21. The process of claim 15, wherein the upper sheet is bonded by lining or by coextrusion of the upper and lower sheets.

22. The process of claim 13, wherein at least one of the sheets comprise a random copolymer wherein greater than 50% of the copolymer is derived from propylene monomer.

23. The process of claim 13, wherein at least one of the sheets comprises a mixture of polymers wherein greater than 50% of the mixture is derived from propylene monomer.

24. The process of claim 13, wherein the lower sheet is plasticized by a compound selected from the group consisting of atactic polypropylene, ethylene-propylene-diene, copolymer, ethylene-vinylacetate copolymer, ethylene-propylene rubber and mixtures thereof.

25. The process of claim 13, wherein the lower sheet comprises between 50 and 100 parts filler per 100 parts polymer.

26. The process of claim 25, wherein the filler comprises calcium carbonate.

27. The process of claim 13, wherein the upper sheet includes an outer face and inner face, further comprising treating the outer face of the upper sheet.

28. The process of claim 27, wherein the treating step comprises graining the outer face of the upper sheet.

29. The process of claim 27, wherein the treating step comprises depositing a layer of varnish to at least a localized area of the outer face of the upper sheet to improve the light resistance or wear resistance of the outer face of the upper sheet.

* * * * *